United States Patent [19]

Murakami et al.

[11] 4,377,095
[45] Mar. 22, 1983

[54] SPEED CHANGE GEAR SYSTEM

[75] Inventors: Noboru Murakami; Hiromi Hasegawa, both of Nagoya; Yoshinobu Iwase, Toyokawa, all of Japan

[73] Assignee: Aisin Seiki Kabushiki Kaisha, Kariya, Japan

[21] Appl. No.: 203,518

[22] Filed: Nov. 3, 1980

[30] Foreign Application Priority Data

Nov. 7, 1979 [JP] Japan .................................. 54-144900

[51] Int. Cl.³ ............................................. F16H 57/10
[52] U.S. Cl. ....................................... 74/759; 74/763; 74/764
[58] Field of Search ................. 74/759, 758, 764, 753, 74/762, 763

[56] References Cited

U.S. PATENT DOCUMENTS

| | | | |
|---|---|---|---|
| 3,523,468 | 8/1970 | Kepner | 74/759 |
| 3,705,521 | 12/1972 | Smith | 74/759 |
| 3,863,524 | 2/1975 | Mori et al. | 74/759 X |
| 4,089,239 | 5/1978 | Murakami et al. | 74/759 X |
| 4,143,562 | 3/1979 | Murakami et al. | 74/759 X |
| 4,157,046 | 6/1979 | O'Malley | 74/759 |

*Primary Examiner*—George H. Krizmanich

*Attorney, Agent, or Firm*—Finnegan, Henderson, Farabow, Garrett & Dunner

[57] ABSTRACT

A speed change gear system of the type including an input shaft, an output shaft, three planetary gear sets each having a central sun gear, an ring gear, a set of planetary pinion gears meshingly connecting the sun gear with ring gear and a revolving carrier rotatably supporting the pinion gear, two clutches, and three brakes. The improved system provides four forward speeds including an overdrive shift and one reverse and comprises five integrally rotatable units formed by combining elements of three planetary gear sets, including a first integrally rotatable unit formed by the sun gear in the first planetary gear set, a second integral unit connectable with the input shaft through a first clutch and having the revolving carrier in the second planetary gear set, the intenal ring gear in the first planetary gear set and the sun gear in the third planetary gear set all operatively interconnected, a third integral unit connectable to the input shaft through a second clutch and formed by the sun gear in the second planetary gear set, a fourth integral unit including the ring gears in the second and third planetary gear sets which are operatively interconnected, and a fifth integral unit including revolving carriers in the first and third planetary gear sets operatively interconnected, wherein each of the brakes is provided for the respective second, third and fourth integral units.

6 Claims, 1 Drawing Figure

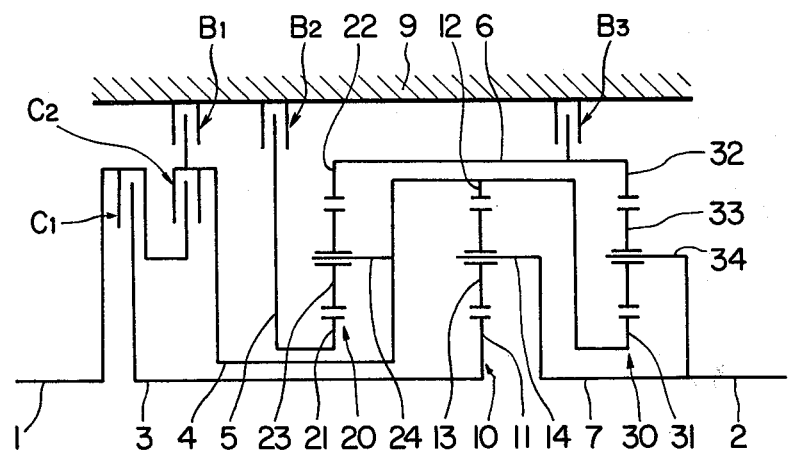

SPEED CHANGE GEAR SYSTEM

BACKGROUND OF THE INVENTION

1. Field of the Invention

The present invention relates generally to speed change gear systems for automotive vehicles, and more particularly to a speed change gear system suited for applications in which fluid couplings or hydraulic torque converters are to be employed for operation with the gear system, and which is capable of shifting through four forward speeds including an overdrive shift range and one reverse shift range.

2. Description of the Prior Art

As it is usually the practice in the prior art, the reduction gear ratio in the highest gear shift range provided by the speed change gear system is set to 1.0 permitting the input and output shafts directly to be coupled.

In order to meet the requirements set forth by the existing regulations on the vehicle exhaust gases or in order to improve the fuel economy, it is desirable when the vehicle is running at constant and stable speeds with less engine load variations to provide a reduction gear range of less than 1.0 or overdrive range, i.e., a gear ratio with an enhanced revolution speed, thereby preventing the engine speed from deviating from its predetermined revolution range. Therefore, it has been suggested that the speed change gear system be capable of providing an overdrive shift range. It is possible to provide three or four forward speed shift ranges and one reverse shift range employing three planetary gear sets whose arrangement is disclosed in U.S. Pat. No. 3,956,946.

An arrangement including a combination of three planetary gear sets whose members (gears and carriers) constitute five rotationally connected, integrally rotatable units ["integral unit(s)" hereinafter] composing a gear-engaging combination ["gear train" hereinafter] of five integral units with freedom of rotation. A driving power train with a predetermined change gear ratio is formed by the following: one of the five integral units being connected with the output shaft, two of the remaining sets being connected to the input shaft, and the other set being connected to a stationary (locking) member such as a gear casing (however, to be connected to the input shaft, if direct coupling is desired). This gear train permits a switching from one power train to another different power train with a different predetermined reduction gear ratio by switching a mode of connection of five integral units. Thus a set of shift ranges including from 3 to 4 forward shift ranges and one reverse shift range may be realized.

On the other hand, there are possible various modes in connecting and combining the elements of three planetary gear sets which permit numbers of gear trains.

However, the speed change gear system for specific use with the automatic transmissions on vehicles which provides four forward speeds (shift ranges) and one reverse shift range including an overdrive shift range should desirably satisfy the following requirements:

1. The output shaft should always remain coupled to the same member of the gear train regardless of switching from one power train to another;

2. In order to reduce the peripheral speed of the bearings or friction contact portions such as clutches and brakes, and avoid any troubles due to centrifugal force, each individual element within the planetary gear sets should not have an abnormal number of revolutions;

3. The load on gear teeth, i.e., the tangential force, of each element should be small with respect to the strength of the gear teeth;

4. The number of teeth on individual gears of the planetary gear sets should be determined to satisfy the meshing requirements, and smaller-diameter gears (sun gears, planetary pinion gears) should not have less teeth than normally required;

5. The planetary gear sets should be capable of being combined as desired in such a manner that connections among the individual elements are made as short and simple as possible and the connections allow clutches and brakes to be installed with ease;

6. The shifting during the vehicle forward running is done by switching frictional means such as clutches and brakes to select a desired power train. Then, the switching should be effected by switching only one frictional means so that any impact on switching can be reduced to a minimum; and 7. The speed change gear system should be capable of being completed by the existing frictional elements for providing the conventional shifts without requiring additional frictional elements for providing an overdrive gear shift in the existing four forward speed ranges, and yet the system should be capable of providing a reduction gear range of from 0.6 to 0.85.

The known speed change gear systems of the type disclosed herein cannot meet the requirements hereinabove mentioned.

It is therefore one object of the present invention to provide a novel and improved speed change gear system which can meet the above requirements.

It is another object of the present invention to provide a speed change gear system which employs a minimum number of friction elements, i.e., 2 clutches and three brakes to provide four forward speeds including an overdrive shift range, and one reverse employing three planetary gear sets.

BRIEF DESCRIPTION OF THE DRAWINGS

Those and other objects and features of the present invention will become apparent from the description which follows hereinafter with reference to a preferred embodiment shown in the accompanying drawing, in which:

A single FIGURE is a skeleton view illustrating the arrangement of the gear trains in the speed change gear system according to a preferred embodiment of the present invention.

DETAILED DESCRIPTION OF THE PREFERRED EMBODIMENTS

Referring now to the drawing illustrating one preferred embodiment of the present invention, the speed change gear system includes an input shaft 1 to be connected with a power transmission shaft from a fluid coupling assembly or hydraulic torque converter on automotive vehicles such as automobiles, an output shaft 2 to be connected with a propeller axle connected with a driving wheel or gears in the final reduction gear unit, three planetary gear sets 10, 20 and 30 aligned in a coaxial relationship, two clutch assemblies $C_1$ and $C_2$ and three brake assemblies $B_1$, $B_2$ and $B_3$. Each of the three planetary gear sets 10, 20 and 30 comprises three elements which are to be linked to other external members, the three elements for each set including respectively a sun or central gear 11, 21, 31, a coaxial ring gear 12, 22, 32 with internal teeth, and a revolving carrier 14, 24, 34 rotatably supporting a set of intermediate planetary pinion gears 13, 23, 33 meshingly interposed between the sun gear and the ring gear. Each set of planetary pinion gears is represented as a single element in the Figure for convenience of illustration.

It is well known to the art that restricting the rotation of any one of the three elements allows the other two elements to rotate in a predetermined relationship with each other. For the convenience of simplicity in the illustration hereinafter, a more detailed description of the operation of those three elements in a planetary gear set is omitted.

As described above, the three planetary gear sets are combined with their elements to provide five integrally rotatable units meshing to form a gear train, clutch assemblies and brake assemblies whose individual arrangement and mechanical interconnections are described in detail in the following.

The sun gear 11 included in a first planetary gear set 10 forms a first integral unit 3 of the gear train. A first clutch unit $C_1$ is interposed between the input shaft 1 and the first integral unit 3 which usually provides an intermediate shaft. The carrier 24 in a second planetary gear set 20, the internal ring gear 12 in the first planetary gear set 10, and the sun gear 31 in a third planetary gear set 30 are intermeshed to form a second integral unit 4 of the gear train. A second clutch units $C_2$ is disposed between the integral unit 4 and the input shaft 1. As shown, a first brake unit $B_1$ is also provided between the integral unit 4 and a gear casing 9 which provides a locking function as a stationary member. The sun gear 21 in a second planetary gear set 20 provides a third integral unit 5. Second brake unit $B_2$ is disposed between integral unit 5 and gear casing 9.

The internal ring gears 22, 32 in the second and third planetary gear sets 20, 30 are interconnected to provide a fourth integral unit 6. A third brake unit $B_3$ is provided between the unit 6 and the gear casing 9. The revolving carriers 14 and 34 in the first and third planetary gear sets are interconnected to form a fifth integral unit 7, which is connected with the output shaft 2. The first and second clutch units $C_1$ and $C_2$ are actuated by means of appropriate fluid operating means (not shown) to couple or uncouple the input shaft 1 with the first unit 3 or couple or uncouple the input shaft 1 and the second unit 4, respectively. The first through third brake units $B_1$ to $B_3$ are actuated by appropriate fluid operating means (not shown) to cause any selected one of the integral units within the planetary gear sets to be braked or locked.

The speed change gear system whose arrangement has been described hereinabove is operated to provide four forward speeds and one reverse in accordance with the operation of the associated clutch units $C_1$ and $C_2$, and brake units $B_1$ to $B_3$ as shown in Table 1.

TABLE 1

|  | $C_1$ | $C_2$ | $B_1$ | $B_2$ | $B_3$ |
|---|---|---|---|---|---|
| 1st speed | 0 |  | 0 |  |  |
| 2nd speed | 0 |  |  | 0 |  |
| 3rd speed | 0 | 0 |  |  |  |
| 4th speed |  | 0 |  | 0 |  |
| reverse |  | 0 |  |  | 0 |

In the above table, the symbol (O) indicates that the appropriate clutch units and/or brake units are actuated, and a blank indicates that the appropriate ones are in nonactuated conditions.

Specific values for each shift accomplished by the gear change system according to the invention are given hereinbelow by way of example. In order to determine those values, the number of teeth of each gear in the planetary gear sets is represented by Z. The number suffixed to the symbol Z indicates a gear which is given a corresponding reference numeral.

Each gear ratio for the planetary gear sets is obtained as follows, the respective gear ratios for the first, second and third planetary gear sets being represented by $\rho_1$, $\rho_2$ and $\rho_3$, respectively. The following set of gear ratios is one of most preferred ratios.

$\rho_1 = Z_{11}/Z_{12} = 0.4783$  ($Z_{11}=33$, $Z_{12}=69$)

$\rho_2 = Z_{21}/Z_{22} = 0.4783$  ($Z_{21}=33$, $Z_{22}=69$)

$\rho_3 = Z_{31}/Z_{32} = 0.4493$  ($Z_{31}=31$, $Z_{32}=69$)

The reduction gear ratios i in each shift can thus be obtained from the equations given in Table 2.

TABLE 2

| Shifts | reduction gear ratio (equation) | calculation results |
|---|---|---|
| 1st speed | $i_1 = 1 + 1/\rho_1$ | 3.091 |
| 2nd speed | $i_2 = 1 + \rho_2/[\rho_1(1 + \rho_2 + \rho_3)]$ | 1.519 |
| 3rd speed | $i_3 = 1$ | 1.000 |
| 4th speed | $i_4 = (1 + \rho_3)/(1 + \rho_2 + \rho_3)$ | 0.752 |
| reverse | $i_r = -[1/\rho_1 \cdot \rho_3) - 1]$ | −3.653 |

On shifting to each speed, each ratio of the number of revolutions of each integral unit and the associated elements within the planetary gear sets to that of the input shaft is obtained as presented in Table 3. The torque ratio of each elements of the planetary gear sets to the input shaft can be determined as presented in Table 4. As readily understood from the foregoing description, the tangential force to be exerted on each gear within the planetary gear sets can be determined by calculation from the torque acting on the ring gears. Therefore, if comparison alone is desired, the result may be obtained simply by comparing the torque values on each of the ring gears.

TABLE 3

| shifts | 3 | 4 | 5 | 6 | 7 | 23 | 13 | 33 |
|---|---|---|---|---|---|---|---|---|
| 1st speed | 1 | 0 | −0.98 | 0.47 | 0.32 | 1.80 | −0.92 | 0.83 |
| 2nd speed | 1 | 0.50 | 0 | 0.73 | 0.66 | 1.40 | 1.28 | 0.93 |
| 3rd speed | 1 | 1 | 1 | 1 | 1 | 1 | 1 | 1 |
| 4th speed | 2.02 | 1 | 0 | 1.48 | 1.33 | 2.83 | 2.60 | 1.90 |
| reverse | 1 | −0.88 | −2.73 | 0 | −0.27 | 2.50 | −2.61 | 0.72 |

TABLE 4

| shifts | 21 | 22 | 24 | 11 | 12 | 14 | 31 | 32 | 34 |
|---|---|---|---|---|---|---|---|---|---|
| 1st speed | 0 | 0 | 0 | 1 | 2.09 | −3.09 | 0 | 0 | 0 |
| 2nd speed | 0.52 | 1.09 | −1.60 | 1 | 2.09 | −3.09 | −0.49 | −1.09 | 1.57 |
| 3rd speed | 0 | 0 | 0 | 0.32 | 0.68 | −1.00 | 0 | 0 | 0 |
| 4th speed | −0.25 | −0.52 | 0.77 | 0 | 0 | 0 | 0.23 | 0.52 | −0.75 |
| reverse | 0 | 0 | 0 | 1 | 2.09 | −3.09 | −2.09 | −4.56 | 6.74 |

The first planetary gear set has a sun gear/ring gear tooth ratio of the range of from 0.3 to 0.6, preferably from 0.4 to 0.5. Similarly, the second and third gears sets may have the same teeth ratio range, respectively. It is noted, however, that, generally, the gear ratio ρ is practically limited to the above range particularly for automobile applications. For the highest speed range (fourth forward speed), the reduction gear ratio is selected to the range of from 0.6 to 0.85, preferably from 0.75 to 0.8. In this case, if a reduction gear ratio of less than about 0.6 is selected, it is not desirable from the standpoint of the car design since it practically leads to an improper employment of an engine having an excessive output torque in comparison to the weight of the vehicle. If the reduction gear ratio is more than about 0.85, there would be no particular merit of employing a specific shift range for the highest speed.

The reduction gear ratio in each shift range is determined according to the values of from $\rho_1$ to $\rho_2$ given above, but particularly in accordance with the present invention, the most preferable reduction gear ratio in each shift range can be implemented by the combined clutch and brake elements as shown in Table 1. As Table 1 shows the operative relationship among the brakes from $B_1$ to $B_3$ and clutches $C_1$ and $C_2$, each shifting is accomplished by causing only one brake to actuate, thus eliminating the need of causing two or more brakes to operate simultaneously. This feature can minimize any possible impacts that may be caused if the simultaneous operation of the two or more brakes should otherwise be involved. Shifting to the highest speed range can be provided by permitting the second integral unit 4 to be connected with the input shaft 1 by way of the second clutch unit $C_2$ and causing the third integral unit 5 to be braked by the second brake unit $B_2$. At this moment, a higher driving torque is imparted to the thus connected integral units and associated gears, however, as the relative rotational speed ratio existing between the sun gears and ring gears within the second and third planetary gear sets 20, 30 which provide the shifting to the highest speed is maintained in a relatively small value, it can advantageously prevent the planetary pinion gears from rotating in excessively high speeds. As readily understood from the above, even at the highest gear shifting, the torque can be transmitted smoothly.

One of the most desirable arrangements of the first, second and third planetary gear sets is such that they are arranged in a order of the second, first and third set, starting from on the side of the input shaft toward the output shaft. By implementing the arrangement in the above manner, it is advantageously easier to realize the interconnections of the individual elements within the respective integral units and install the brake and clutch units in proper positions. Various other arrangements may be possible. For example, the output shaft may be oriented in the same direction as the input shaft, or may be provided by way of a bevel gear and extended perpendicular to the axis of the planetary gear sets.

Accordingly as apparent from the disclosure hereinabove, the present invention provides a new speed change gear system capable of satisfying the aforementioned requirements and objects, i.e., providing four forward speeds including one overdrive shift range and one reverse shift range with a minimum number of elements, i.e., with two clutch means and three brake means based on three planetary gear sets.

Any modifications may be effected without departing from the spirit and scope of the present invention based on the essential disclosure hereinabove disclosed.

What is claimed is:

1. In a speed change gear system of a type including gear casing, an input shaft, an output shaft, three sets of planetary gear means each having a central sun gear, a ring gear internally toothed, a set of planetary pinion gears for meshingly connecting said sun gear and said ring gear and a revolving carrier rotatably supporting said pinion gears, clutch means, and brake means, a speed change gear system comprising:

a first integrally rotatable unit including a sun gear in a first planetary gear set, the unit being connectable with an input shaft through first clutch means;

a second integrally rotatable unit connectable to the input shaft through second clutch means and including a revolving carrier in a second planetary gear set, a ring gear in said first planetary gear set and a sun gear in a third planetary gear set;

a third integrally rotatable unit including a sun gear in the second planetary gear set;

a fourth integrally rotatable unit including interconnected ring gears in the second and third planetary gear set;

a fifth integrally rotatable unit connected to the output shaft including interconnected revolving carriers for the planetary pinion gears in the first and third planetary gear sets;

three brake means each connected to the gear casing as a stationary member and being operable on said second, third and fourth integrally rotatable unit, respectively; and said two clutch means each for connecting and disconnecting said first unit with the input shaft and said second unit with the input shaft, respectively; wherein said first through fifth integrally rotatable units constitute a gear train.

2. A speed change gear system as defined in claim 1, wherein it provides four forward speed shift ranges including an overdrive shift range and one reverse.

3. A speed change gear system as defined in claim 2, wherein said overdrive shift range has a reduction gear ratio of the range of from 0.6 to 0.85.

4. A speed change gear system as defined in claim 2, wherein said overdrive shift range has a reduction gear ratio of the range of from 0.75 to 0.8.

5. A speed change gear system as defined in claim 1, wherein the sun gear and ring gear in each of said planetary gear sets have a sun gear/ring gear gear ratio of from 0.3 to 0.6.

6. A speed change gear system as defined in claim 1, wherein the sun gear and ring gear in each of said planetary gear sets have a sun gear/ring gear gear ratio of from 0.4 to 0.5.

* * * * *